3,202,683
HALOGENATED AND OLEFINICALLY UNSATURATED 3-KETO-STEROIDS AND METHOD FOR MAKING THE SAME FROM THE CORRESPONDING 3-KETO-STEROID CARBOXYLIC ACIDS
Bernhard Krieger, Senne II, Kreis Bielefeld, and Egbert Blanke and Emanuel Kaspar, Kamen, Germany, assignors to Schering AG., Berlin, Germany
No Drawing. Filed Nov. 26, 1963, Ser. No. 326,246
Claims priority, application Germany, Nov. 24, 1962, Sch 32,382, Sch 32,383; Aug. 21, 1963, Sch 33,735
22 Claims. (Cl. 260—397.3)

This invention relates to methods for preparing halogen substituted 3-keto-steroids by exchange of carboxyl groups present in a steroid starting material for halogen, to methods for dehydrohalogenating the resulting products to introduce unsaturations into the steroid, and to halogenated and unsaturated steroid materials prepared by these methods.

In particular, according to the present invention a steroid carboxylic acid is reacted with a halogenating agent in the presence of a heavy metal compound, such as a heavy metal oxide or heavy metal salt, for example, lead or mercury oxide or lead or mercury acetate. The reaction mixture is then treated in a conventional manner for the purpose of isolating and purifying the desired halogenated product. In the final product, the steric arrangement of the ξ-halogen atom is uncertain: α- or β-isomers, or a mixture of both, may be present.

Steroid carboxylic acids are well-known in the art as is evidenced by the following literature referring to their preparation: Annalen 507, 128 (1933) [bis-nor-allocholane-3-one-22-acid]; Berichte 68, 1854 (1935) [$\Delta^4$-bis-nor-cholene-3-one-22-acid, $\Delta^1$-bis-nor-allo-cholene-3-one-22-acid]; J. Am. Chem. Soc. 60, 1493, 1495 (1938) [bis-nor-cholane-3,12-dione-22-acid]; J. Am. Chem. Soc. 62, 645 (1940) [bis-nor-cholane-3,6-dione-22-acid, bis-nor-allo-cholane-3,6-dione-22-acid]; J. Org. Chem. 5, 660–668 (1940) [3,7,11-triketo-etiocholane acid]; J. Am. Chem. Soc. 66, 1099–1102 (1944) [$\Delta^4$-bis-nor-cholene-12α-ol-3-one-22-acid, bis-nor-cholane-12α-ol-3-one-22-acid]; J. Am. Chem. Soc. 74 5814–5816 (1952) [bis-nor-cholane-3,11-dione-22-acid]; Chem. Soc. (London) J. 1954, 2627 [bis-nor-cholane-3-one-22-acid].

According to one embodiment of the invention, the exchange of halogen for a carboxyl group of a steroid carboxylic acid can be achieved by reacting, for example, a $\Delta^4$-3-keto-bis-norcholene acid such as bis-nor-$\Delta^4$-cholene-3-one-22-acid with a halogen, preferably bromine or iodine, in an organic solvent in the presence of a heavy metal compound such as a heavy metal oxide or salt such as lead or mercury oxide or lead or mercury acetate. The reaction mixture is suitably illuminated with visible light, such as that from an ordinary incandescent bulb, since this tends favorably to increase reaction velocity and product yield. The intensity of the light source is not critical, but is chosen with a view to the volume of reaction mixture to be irradiated.

According to another embodiment of the invention, the desired halogen-substituted steroids can be obtained by exchange of a carboxyl group present in the starting material for halogen by reacting the steroid carboxylic acid with a halogenated hydrocarbon forming free radicals, preferably a tetrahalogenmethane, in the presence of an agent promoting the formation of free radicals, preferably light or an unstable free-radical forming azo compound such as azo-bis-butyro-nitrile, and in the presence of a heavy metal compound, such as a heavy metal oxide or heavy metal salt, for example lead or mercury oxide or lead or mercury acetate. The reaction mixture is then treated in the usual way for the purpose of isolating and purifying the desired reaction product.

As halogenated hydrocarbons acting as free radical donors, the tetrahalogenmethanes, such as tetrachloromethane, bromotrichloromethane, and tetrabromomethane are particularly suitable. The agents promoting the desired radical formation are all those compounds which are known favorably to influence the cleavage of halogenhydrocarbons into radicals. For carrying out the reaction of the invention, azo-bis-butyronitrile and other materials, are useful, for example. The use of visible light is particularly suitable, such as that from an ordinary incandescent bulb, for example.

The preparation of desired halogenated steroids according to the present invention can be carried out by very simple techniques since the exchange of the carboxyl group takes place under extraordinarily mild conditions, particularly of reaction time and reaction temperature. As a rule, the reaction temperature does not exceed 100° C. In many cases, the reaction can be carried out even at 50° C., or even at lower temperatures such as room temperature.

Such temperature changes, however, have little influence on the inherently rapid course of the reaction. Often, the reaction is complete after only a few minutes, and has never been observed to take more than about 6 to 8 hours.

The metal oxides or metal salts are preferably combined with the steroids to be reacted in an at least equivalent amount in order to favor as complete a reaction of the starting material as possible.

The halogenation reactions suitably proceed in the presence of a solvent or diluent not interfering with the reaction. As solvents for halogenation with free halogens, hydrocarbon and halogenated hydrocarbons are suitable. These materials include aromatic, aliphatic, and cycloaliphatic hydrocarbons such as benzene and the alkylbenzenes such as toluene and the xylenes, hexane, heptane, and cyclohexane, for example. Halogenated aliphatic hydrocarbons such as methylene chloride, or tetrahalogen methanes such as carbon tetrachloride, and corresponding bromo- and iodo-analogues are also suitable solvents. The latter materials, it will be recognized, can themselves react to halogenate the steroid acid, as in the second embodiment of the invention described herein. Thus, the solvent or diluent materials of the invention are "inert" in the sense of being non-interfering with the essential halogenation reaction under the reaction conditions employed, either by being completely passive or by themselves acting as halogenating agents. In any event the solvents are inert with respect to the halogenating agent employed under the reaction conditions of the invention.

When halogenated hydrocarbons are employed as the sole halogenating agent, according to the second embodiment described above, they simultaneously function as a solvent for the reaction. Additional hyrocarbon materials of the type earlier described may be added as diluents, if desired.

It is known in the prior art that 3β-acetoxy-11-oxo-bis-norallocholane acid can be converted to 3β-acetoxy-11-oxo-20-iodo-allopregnane by means of iodine and lead tetra-acetate under illumination (Barton, Proceeding of Soc., 1962, 309). Nevertheless, it is surprising that this reaction can be used with 3-keto-$\Delta^4$-steroids. It is well known from numerous literature sources that, in the presence of a 3-keto-$\Delta^4$-group in the steroid molecule, reaction with lead tetra-acetate leads to the corresponding 2-acetoxy-steroids (cf. Clarke, J. Am. Chem. Soc., 77, 661 (1955); Fieser, J. Am. Chem. Soc., 75, 4716 (1953); Syntex, U.S. Patent 2,602,803).

It is also known in the prior art that ultraviolet light cleaves carbon tetrachloride with formation of radicals, and that the radicals formed add to double bonds. However, it is surprising that, under the conditions of the present invention, a carboxyl group will be selectively substituted by halogen, particularly by chlorine or bromine, in the presence of a free-radical forming halogenated hydrocarbon, without an attack of other radical-sensitive groups which may also be present in the molecule, such as the keto group or a double bond, whether direct or in the allyl position.

The new halogensteroids prepared according to the invention are useful as intermediates in the preparation of usefully active steroids known in the prior art.

For example, the new halogensteroids which have the general formula St—CH·X·CH$_3$, wherein St is a cyclopentylperhydrophenanthrene-17-yl-radical, and X is a halogen atom, preferably chlorine, bromine, or iodine, can be converted into corresponding steroids of the formula St=CH·CH$_3$ by dehydrohalogenation according to another aspect of this invention. As acid binding agents suitable for splitting off hydrogen halide, strong organic bases, including amines such as pyridine and alkyl-substituted pyridines, e.g. collodine, and amides such as dimethylformamide, can be used, or alcoholic solutions of alkali metal and alkaline earth metal hydroxides, or agents such as lithium salts in dimethylformamide, silver chromate in aqueous acetone, potassium acetate in acetic acid, and the like. The halogenated steroid and dehydrohalogenating agent are suitably contacted at temperatures between room temperature and about 200° C., but in any event at a temperature below the decomposition temperature of the reactants or reaction products. Reaction times are not critical, and may vary from an hour or less to a day, depending on the degree of completeness desired for the reaction.

From the unsaturated products obtained in this manner, for example from 3-keto-$\Delta^{4,17(20)}$-pregnadienes such as $\Delta^{4,17(20)}$-pregnadiene-3-one from 20-iodo-$\Delta^4$-pregnene-3-one, the corresponding 17α-hydroxyprogesterones can easily be obtained by a suitable combination of known synthetic steps using H$_2$O$_2$-OsO$_4$ [cf. Miescher; Helv. 33, 1840 (1950)]. This product can in turn be esterified to form the active 17α-hydroxyprogesterone esters, or can be formed into corticoid hormones by way of "Reichstein S." Also, testosterones are available by way of androstenedione by ozonization [U.S. Patent 2,844,605] and subsequent partial reduction with NaBH$_4$ [Sondheimer, Chem. Ind., 1482 (1954)]. Ethynyltestosterones are obtainable from androstenedione by methods known in the art, for example by ethynylation according to U.S. Patent 2,962,509.

The production of 17α-hydroxyprogesterone or of Reichstein S also proceeds from $\Delta^{17}$-5β-pregnene-3-one (obtained from 20-halo-5β-pregnane-3-one by means of dehydrohalogenation), by a process according to which, in the manner indicated above, 4,5-dihydro-17α-hydroxyprogesterone or 4,5-dihydro-Reichstein S is first prepared, and is subsequently converted by known microbiologic or chemical methods into the $\Delta^4$-compound (e.g.) U.S. Patent 2,876,171. In an analogous manner, $\Delta^{2,6}$-17α-hydroxyprogesterone or 17α-hydroxyprogesterone can be prepared from 2,6,20-tribromo-$\Delta^4$-pregnene-3-one or 4,20-dibromopregnane-3-one, whereby the double bonds present in the nucleus are introduced by dehydrohalogenation in the usual fashion. These products can then be converted into the corresponding esters, or into the corresponding Reichstein S derivatives. 17β-bromo-5β-androstane-3-one, for example, is easily converted by known techniques into androstandione (e.g. by silver chromate-chromic acid in an analogous manner to Pelc, C. A. 51 14774 (1957)), which is converted by known methods to androstendione.

A better understanding of the present invention, and of its many advantages, can be had by referring to the following specific examples, given by way of illustration.

*Example 1*

A suspension of 2.8 gm. of lead (IV) acetate in 80 ml. of absolute carbon tetrachloride was heated to boiling with stirring and with illumination from a 500 watt incandescent lamp, and then combined with 2 gm. of bis-nor-$\Delta^4$-cholene-3-one-22-acid in 200 ml. of absolute carbon tetrachloride. After the acid had dissolved in about 15 minutes, the dropwise addition of a saturated solution of iodine in absolute carbon tetrachloride was begun. The iodine solution was no longer decolorized after about a 4–5 hour addition. The reaction solution was then cooled to room temperature, washed with a solution of sodium thiosulfate and with water, dried over sodium sulfate, and evaporated to dryness after filtration. The raw product isolated was chromatographed on neutral silica gel. 2.4 gm. (83% of theory) were eluted with a mixture of benzene and ether. After recrystallization from ethanol, the 20-iodo-$\Delta^4$-pregnene-3-one so obtained had a melting point of 149° C. (decomp.).

*Example 2*

A suspension of 216 mgm. of mercury oxide in 50 ml. of absolute carbon tetrachloride was heated to boiling with stirring and illumination from a 500 watt incandescent lamp, and then combined with 345 mgm. of bis-nor-$\Delta^4$-cholene-3-one-22-acid in 100 ml. of absolute carbon tetrachloride. After 15 minutes' heating under reflux, 254 mgm. of iodine, dissolved in 50 ml. of absolute carbon tetrachloride, were added dropwise over 4 hours, whereupon the acid gradually went into solution. Subsequently the material was treated as in Example 1. The yield of 20-iodo-$\Delta^4$-pregnene-3-one so obtained amounted to 330 mgm. (78% of theory) after chromatography.

*Example 3*

A suspension of 1.28 gm. of lead (IV) acetate in 20 ml. of absolute carbon tetrachloride was heated to boiling with stirring under illumination from a 500 watt incandescent lamp, and then combined with 1.05 gm. of bis-nor-cholane-3-one-22-acid in 50 ml. of absolute carbon tetrachloride. After the solid had dissolved in about 15 minutes, a saturated solution of one equivalent of iodine in absolute carbon tetrachloride was added dropwise. The iodine solution was no longer decolorized after about five hours' addition. The reaction solution was cooled to room temperature, then washed with sodium thiosulfate solution and with water, dried over sodium sulfate, filtered, and evaporated to dryness in vacuum. The isolated raw product (1.18 gm.) was chromatographed on neutral silica gel. The 20 ξ-iodo-5β-pregnane-3-one (yield =70%) so obtained was eluted with a mixture of carbon tetrachloride and methylene chloride. After recrystallization from ethanol it melted at 127–128° C. (decomp.).

*Example 4*

2 gm. of bis-nor-$\Delta^4$-cholene-3-one-22-acid, 2.6 gm. lead (IV) acetate in 100 ml. of carbon tetrachloride, and 0.8 ml. of bromine in 110 ml. of carbon tetrachloride were reacted as in Example 1 for about 1½ hours, and then worked up. The isolated raw product was chromatographed on neutral silica gel, whereby 2,6, 20ξ-tribromo-$\Delta^4$-pregnene-3-one was isolated with a mixture of benzene and petroleum ether. The product, after recrystallization from acetone-isopropylether, melted at 167°–168° C. (decomp.). $\epsilon_{250}$=12000.

*Example 5*

A suspension of 2.6 gm. of lead tetraacetate and 2 gm. of bis-nor-$\Delta^4$-cholene-3-one-22-acid in 90 ml. of absolute carbon tetrachloride was refluxed for 8 hours with stirring under illumination from a 500 watt incandescent bulb. The reaction mixture was then filtered, and the filtrate combined with ethylene glycol, washed with water, and dried over sodium sulfate. The filtered solution was then evaporated to dryness. The oily-crystalline residue was filtered over silica gel, whereupon 20ξ-chloro-Δ⁴-pregnene-3-one was eluted with benzene/methylene chloride. After recrystallization from isopropyl ether, the melting point was at 186°–187° C. (yield=41%).

*Example 6*

A suspension of 345 mgm. of bis-nor-Δ⁴-cholene-3-one-22-acid, 488 mgm. of lead (IV) acetate, and 664 mgm. of tetrabromomethane in absolute benzene was refluxed for 3½ hours with stirring and illumination from a 500 watt lamp. The cooled reaction product was worked up as in Example 5. The isolated raw product was chromatographed on neutral silica gel, whereupon 20-bromo-Δ⁴-pregnene-3-one (a mixture of the 20α-and 20β-compounds) was eluted with benzene. The product melted at 168°–171° C. after recrystallization from isopropyl ether. $\epsilon_{241}$=16100. Yield=36%.

*Example 7*

2.5 gm. of bis-nor-cholane-3-one-22-acid were dissolved in 20 ml. of absolute methylene chloride, combined with a suspension of 3.5 gm. of lead tetraacetate in 10 ml. of absolute methylene chloride, and stirred for 30 minutes at room temperature. Then 2.4 gm. of carbon tetrabromide in 30 ml. of absolute methylene chloride were added under illumination from a 500 watt incandescent lamp. The mixture was stirred for five hours. Thereafter, a small amount of ethylene glycol was added to the reaction mixture, the organic phase was washed with water, dried, and concentrated in vacuum. The white crystalline residue was filtered over silica gel, whereupon the desired 20 ξ-bromo-5β-pregnane-3-one was eluted with benzene. Melting point=170°–170.5° C. (decomp.). Yield=30%. Bromine calc.: 21.00%; bromine found: 20.6%.

*Example 8*

A suspension of 1.27 gm. bis-nor-cholane-3-one-22-acid and 1.63 gm. of lead tetra-acetate in 90 ml. of absolute carbon tetrachloride was refluxed for 7 hours with stirring and illumination from a 500 watt bulb. Theretfter the precipitate present was removed by filtration, the organic phase was washed to neutrality, dried, and concentrated in vacuum. The oily yellow residue was chromatographed on silica gel, and 20ξ-chloro-5β-pregnane-3-one was eluted with benzene. Yield=14%. Chlorine calc.: 10.4%; chlorine found: 10.0%.

*Example 9*

A suspension of 2 gm. of bis-nor-Δ⁴-cholene-3-one-22-acid, 400 mgm. of azo-bis-isobutyronitrile, 2.8 gm. of lead (IV) acetate, and 150 ml. of absolute carbon tetrachloride was heated at boiling temperature for 18 hours with stirring. The reaction mixture was combined with ethylene glycol, residues were removed by filtration, and the filtrate was worked up as in Example 5 by filtering over 20 gm. of neutral silica gel (+10% water). The 20ξ-chloro-Δ⁴-pregnene-3-one compound was eluted with a mixture of benzene and methylene chloride. After recrystallization from isopropyl ether, a melting point of 182°–185° C. was observed. Yield=12%.

*Example 10*

A suspension of 200 mgm. of bis-nor-Δ⁴-chlolene-3-one-22-acid, 238 mgm. of lead (IV) acetate, and 20 ml. of trichlorobromomethane was refluxed for 4½ hours under illumination from a 500 watt lamp. The material was worked up as in Example 5. The raw product was filtered on a ten-fold amount of neutral silica gel (+10% water), and 20ξ-bromo-Δ⁴-pregnene-3-one was eluted with benzene. The product melted at 166°–169° C., after recrystallization from isopropyl ether. Yield=50%.

*Example 11*

A suspension of 345 mgm. of bis-nor-Δ⁴-cholene-3-one-22-acid and 217 mgm. of red mercury oxide in 35 ml. of absolute carbon tetrachloride was heated for six hours under illumination as in Example 5 and then worked up. The raw product was likewise filtered over silica gel and 20ξ-chloro-Δ⁴-pregnene-3-one was eluted with benzene/methylene chloride. Recrystallization from isopropyl ether gave a melting point of 185°–187° C.

*Example 12*

A suspension of 200 mgm. of etio-cholane-3-one-20-acid and 238 mgm. of lead (IV) acetate in a mixture of 20 ml. of absolute methylene chloride and 6 ml. of trichlorobromomethane was heated for 7 hours under illumination, as in Example 5, and then worked up. The product was chromatographed on 8 gm. of neutral silica gel. A mixture of benzene and methylene chloride was used to elute 17ξ - bromo - 5β - androstane - 3 - one. Yield=18%. Bromine calc.: 22.62%; bromine found: 21.52%.

*Example 13*

1.5 gm. of 20-iodo-Δ⁴-pregnene-3-one were dissolved in 100 ml. of ethanol, combined with 120 ml. of a 10% solution of potassium hydroxide in ethanol, and refluxed for 1¾ hours. The cooled reaction solution was then poured into ice water and shaken with methylene chloride. The organic phase was washed to neutrality, dried over sodium sulfate, filtered, and evaporated to dryness in vacuum. The residue was chromatographed in a column of neutral aluminum oxide, whereupon a first small amount of Δ$^{4,20(21)}$- pregnadiene-3-one and then 820 mgm. (79% of theory) of Δ$^{4,17}$-pregnadiene-3-one were eluted with a mixture of petroleum ether and benzene. After recrystallization from isopropanol, the melting point was 136°–137° C.

*Example 14*

28 gm. of 20-iodo-Δ⁴-pregnene-3-one were dissolved in 700 ml. of dry dimethylformamide, combined with 28 gm. of lithium bromide and 7 gm. of lithium carbonate, and heated to 80° C. for 1½ hours with stirring. The cooled reaction solution was poured into ice water, acidified with HCl, and extracted with methylene chloride. The separated organic phase was washed with dilute sulfuric acid and water, dried over sodium sulfate, and evaporated to dryness in vacuum after filtration. In this manner, 18.7 gm. of crystalline Δ$^{4,17}$-pregnadiene-3-one were obtained, which melted at 136°–137° C. after recrystallization from isopropanol.

*Example 15*

250 mgm. of 20-chloro-Δ⁴-pregnene-3-one were dissolved in 10 ml. of ethanol, combined with 5 ml. of a 5% solution of potassium hydroxide in ethanol, and refluxed for 19 hours. The cooled reaction solution was then poured into ice water, acidified with HCl, and treated further as in Example 13. The raw product was chromatographed over neutral silica gel (10% water). Δ$^{4,17}$-pregnadiene-3-one was eluted with a mixture of petroleum ether and benzene. The product agreed in melting point and mixed melting point with the substance obtained in Example 13. After recrystallization from isopropanol, the melting point was 136°–137° C. Yield=30%.

*Example 16*

300 mgm. of 20-iodo-5β-pregnane-3-one were dissolved in 20 ml. of dimethylformamide containing 300 mgm. of lithium bromide and 300 mgm. of lithium carbonate, and then heated for two hours at 80° C. The reaction solution was then added dropwise to dilute sulfuric acid, and the mixture was subsequently extracted with methylene chloride. The separated organic phase was washed with water, dried with sodium sulfate, and evaporated to dryness in vacuum. The residue was recrystallized from acetone, whereupon Δ$^{17}$-5β-pregnene-3-one was obtained (80% yield), which, after further recrystallization from acetone, melted at 140–141° C.

Example 17

100 mgm. of 20-bromo-$\Delta^4$-pregnene-3-one were converted to $\Delta^{4,17}$-pregnadiene-3-one, and worked up, as in Example 15. The isolated raw product was chromatographed on neutral silica gel. With a mixture of petroleum ether and benzene, $\Delta^{4,17(20)}$-pregnadiene-3-one was eluted, which, after recrystallization from isopropanol, melted at 134°–136° C. Yield=60%. The mixed melting point with the product obtained in Example 13 showed no depression.

Example 18

75 mgm. of 20-iodo-$\Delta^4$-pregnene-3-one were dissolved in 18 ml. of glacial acetic acid, combined with 200 mgm. of potassium acetate, and stirred for 4 hours at 110° C. After working up and purification as in Example 13, and after recrystallization from isopropanol, $\Delta^{4,17}$-pregnadiene-3-one having a melting point at 130°–134° C. was obtained in 49% yield.

Example 19

A mixture of 1.0 gm. of 20-iodo-$\Delta^4$-pregnene-3-one, 140 ml. of acetone, 24 ml. of water, and 1.0 gm. of silver chromate was stirred at room temperature for 17 hours. The reaction mixture was then reduced to half its original volume in vacuum, combined with water, and extracted with ether. The separated organic phase was washed with water, dried, filtered, and evaporated to dryness in vacuum. The residue was chromatographed over silica gel, and $\Delta^{4,17}$-pregnadiene-3-one was eluted. The product melted at 132°–134° C. after recrystallization from isopropanol. Yield=25%.

Example 20

A solution of 100 mgm. of 20-bromo-5$\beta$-pregnane-3-one, 100 mgm. of LiCl, 100 mgm. of LiBr, and 25 mgm. of Li$_2$CO$_3$, in 50 ml. of dimethylformamide was heated for 5 hours under reflux. The reaction solution was then poured into water strongly acidified with sulfuric acid, and the organic portion taken up into methylene chloride. The methylene chloride solution was washed to neutrality, dried, and concentrated under vacuum. The oily residue was chromatographed on silica gel. In this fashion, the desired $\Delta^{17(20)}$-5$\beta$-pregnene-3-one was eluted with benzene. Yield=61%. After recrystallization from ether, the melting point was 140°–141° C.

Example 21

100 mgm. of 20-chloro-5$\beta$-pregnane-3-one were treated under conditions fully like those in Example 20. The melting point of the $\Delta^{17(20)}$-pregnene-3-one (yield=44%) so obtained was 140°–141° C. after recrystallization from ether.

Example 22

870 mgm. of 4,20-dibromo-5$\beta$-pregnane-3-one (M.P. 185°–186° C.), prepared from bis-nor-cholane-3-one-22-acid in carbon tetrachloride under illumination from a 55 watt bulb in the presence of lead tetraacetate and 3 equivalents of bromine, were dissolved with 900 mgm. of LiCl, 900 mgm. of LiBr, and 100 mgm. of Li$_2$CO$_3$ in 60 ml. of dimethylformamide, and heated under reflux for 5 hours. The reaction solution was then poured into water acidified with sulfuric acid, the precipitate was taken up in methylene chloride, and the phase so obtained was washed to neutrality, dried, and reduced under vacuum. The oily residue was filtered over silica gel, and $\Delta^{4,17}$-pregnadiene-3-one was eluted with benzene. Yield=53%. The melting point was 136°–137° C. after recrystallization from isopropanol.

Example 23

75 mgm. of 20-iodo-$\Delta^4$-pregnene-3-one were dissolved in 18 ml. of dimethyl formamide and refluxed for 6 hours. The material was then cooled and worked up further as in Example 14. After chromatography on neutral aluminum oxide, $\Delta^{4,17}$-pregnadiene-3-one was eluted. Yield=80%. After recrystallization from isopropanol, the pure product melted at 136°–137° C.

Example 24

75 mgm. of 20-iodo-$\Delta^4$-pregnene-3-one were refluxed for 6 hours with collidine. The material was further treated as in Examples 14 and 23. Yield=54%. After recrystallization from isopropanol, $\Delta^{4,17}$-pregnadiene-3-one having a melting point of 136°–137° C. was obtained.

Example 25

75 mgm. of 20-iodo-$\Delta^4$-pregnene-3-one were refluxed for 6¼ hours with pyridine. The material was then further treated as in Examples 14 and 23. Yield=81%. After recrystallization from isopropanol, $\Delta^{4,17}$-pregnadiene-3-one was obtained having a melting point of 136°–137° C.

Example 26

75 mgm. of 20-iodo-$\Delta^4$-pregnene-3-one were dissolved in 8 ml. of propanol, combined with 10 ml. of a 5 percent solution of potassium hydroxide in propanol, and refluxed for 1½ hours. Thereafter, the reaction mixture was further treated as in Example 13. Yield=31%. After recrystallization, $\Delta^{4,17}$-pregnadiene-3-one having a melting point of 136°–137° C. was obtained.

Example 27

75 mgm. of 20-iodo-$\Delta^4$-pregnene-3-one were dissolved in 8 ml. of methanol, combined with 10 ml. of a 2.5% methanolic solution of barium hydroxide, and refluxed for 3 hours. Thereafter, the material was worked up as in Examples 13 and 26. Yield=49%. After recrystallization, $\Delta^{4,17}$-pregnadiene-3-one having a melting point of 136°–137° C. was obtained.

Example 28

2 gm. of 20-iodo-$\Delta^4$-pregnene-3-one were dissolved in 50 ml. of methanol, combined with a suspension of 1.25 g. of lithium hydroxide in 25 ml. of ethanol, and refluxed for 1½ hours. The material was then worked up as in Examples 13 and 26. After recrystallization, $\Delta^{4,17}$-pregnadiene-3-one having a melting point of 136°–137° C. was obtained.

Example 29

A suspension of 220 mgm. of red mercuric oxide (HgO) in 20 ml. of absolute methylene chloride was heated to boiling under a nitrogen atmosphere with stirring and illumination with visible light from a 500 watt incandescent lamp, and was then combined with 350 mgm. of 5$\beta$-bis-nor-cholane-3-one-22-acid in 50 ml. of absolute methylene chloride. The solid substance dissolved within one minute. Hereafter, the dropwise addition of a saturated iodine solution in methylene chloride was begun. After 8 minutes, the solution was no longer decolorized.

The mercuric oxide was removed by filtration from the violet-colored solution, and the excess iodine was washed out with sodium triosulfate. The solution was then further washed with water, dried, and concentrated under vacuum. In this manner 425 mgm. of 20$\xi$-iodo-5$\beta$-pregnane-3-one were obtained. Iodine calculated: 29.6%; iodine found: 29.3%.

Example 30

5 gm. of bis-nor-cholane-3-one-22-acid were dissolved in 150 ml. of carbon tetrachloride, combined with a suspension of 6.1 gm. of lead tetra-acetate in 50 ml. of carbon tetrachloride, and stirred for 15 minutes under a nitrogen atmosphere with illumination from a 500 watt incandescent lamp. To this solution, 1.18 ml. of bromine (1.5 mol) in 50 ml. of carbon tetrachloride were added dropwise over about a period of 30 minutes. The solution was left to stand. A precipitate of lead diacetate was formed, which was removed by filtration. The filtrate was washed with a solution of thiosulfate, and with water, dried over sodium sulfate, and evaporated to dryness after filtration. The crude product (6.4 gm.) was chromatographed on silica gel. In addition to the starting material and to 20-bromo-pregnane, 430 mgm. of 4,20-dibromo-5β-pregnene-3-one having a melting point of 185°–186° C. (decomp.) were isolated after recrystallization from ether. Bromine calculated: 34.8%; bromine found: 34.5%.

*Example 31*

A suspension of 500 mgm. bis-nor-Δ⁴-cholene-3-one-22-acid, 157 mgm. of mercury oxide, 25 mgm. azo-bis-isobutyronitrile and 25 ml. absolute methylenchloride was heated to boiling. To this was given a solution of iodine, dissolved in absolute methylenchloride. After 30 minutes the iodine solution was no longer decolorized. The reaction was worked up as in Example 1, but without chromatography. The yield: 97% on 20ξ-iodo-5β-pregnane-3-one. After recrystallization from methanol it melted at 149–150° C. (decomp.) The substance is the same as in Example 1.

What is claimed is:

1. A process for the halogenation of 3-keto-steroid carboxylic acids selected from the group consisting of 3-keto-steroid-22-oic acids and 3-keto-steroid-20-oic acids by exchange of a carboxyl group of said acids for halogen, which process comprises reacting said acids with a halogenating agent in the presence of a heavy metal compound.

2. A process as in claim 1 wherein said 3-keto-steroid carboxylic acid is a member selected from the group consisting of Δ⁴-3-keto-bis-nor-cholene acid and 3-keto-bis-nor-cholane acid.

3. A process as in claim 1 wherein said heavy metal compound is a member selected from the group consisting of the oxides and inorganic acid salts of lead and mercury.

4. A process as in claim 1 wherein the reaction takes place under irradiation with visible light.

5. A process as in claim 1 wherein said halogenating agent is a member selected from the group consisting of elemental halogens and halogen free-radicals derived from halogenated aliphatic hydrocarbons.

6. A process as in claim 5 wherein said halogen free-radicals are formed by dissociation of said halogenated aliphatic hydrocarbons under irradiation with visible light.

7. A process as in claim 5 wherein said halogen free-radicals are formed by dissociation of said halogenated aliphatic hydrocarbons in the presence of an unstable free-radical forming azo compound.

8. A process as in claim 5 wherein said halogenating agent is an elemental halogen selected from the group consisting of bromine and iodine, and said reaction takes place under irradiation with visible light.

9. A process for the manufacture of $\Delta^{17(20)}$-pregnanes which comprises dehydrohalogenating a steroid of the formula StCHXCH₃ wherein St is a cyclopentylperhydrophenanthrene-17-yl radical and X is halogen, by reacting said steroid StCHXCH₃ with an acid binding agent selected from the group consisting of strong organic bases, alkali metal hydroxides and alkaline earth metal hydroxides, lithium salts, potassium acetate, and silver chromate.

10. A process as in claim 9 wherein said StCHXCH₃ is 20-iodo-Δ⁴-pregnene-3-one.

11. 20-halo-Δ⁴-pregnene-3-one.
12. 20-iodo-Δ⁴-pregnene-3-one.
13. 20-bromo-Δ⁴-pregnene-3-one.
14. 20-chloro-Δ⁴-pregnene-3-one.
15. 20-halo-5β-pregnane-3-one.
16. 20-iodo-5β-pregnane-3-one.
17. 20-chloro-5β-pregnane-3-one.
18. 20-bromo-5β-pregnane-3-one.
19. 17-bromo-5β-androstane-3-one.
20. 2,6,20-tribromo-Δ⁴-pregnene-3-one.
21. 4,20-dibromo-pregnane-3-one.
22. 5β-H-Δ¹⁷-pregnene-3-one.

No references cited.

LEWIS GOTTS, *Primary Examiner.*